(12) United States Patent
Ratz et al.

(10) Patent No.: US 6,220,427 B1
(45) Date of Patent: Apr. 24, 2001

(54) CONVEYOR

(75) Inventors: Holger Ratz; Rudolf Stäb, both of Frankenthal (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/269,755

(22) PCT Filed: Oct. 8, 1997

(86) PCT No.: PCT/DE97/02301

§ 371 Date: Apr. 7, 1999

§ 102(e) Date: Apr. 7, 1999

(87) PCT Pub. No.: WO98/16454

PCT Pub. Date: Apr. 23, 1998

(30) Foreign Application Priority Data

Oct. 12, 1996 (DE) ............................................. 196 42 126

(51) Int. Cl.$^7$ ................................................ B65G 21/00
(52) U.S. Cl. .................. 198/861.2; 198/890; 198/369.5; 198/436; 198/861.6; 198/442; 198/644; 198/587
(58) Field of Search ................................ 198/861.2, 890, 198/369.5, 436, 861.6, 442, 430, 644, 592, 587, 631.1, 369.2

(56) References Cited

U.S. PATENT DOCUMENTS

| | | | |
|---|---|---|---|
| 2,376,857 | * 5/1945 | Arentzen | 198/109 |
| 3,584,731 | * 6/1971 | Dahlem et al. | 198/303 |
| 3,707,218 | * 12/1972 | Payne et al. | 198/838 |
| 3,920,115 | 11/1975 | Craggs . | |
| 3,999,648 | * 12/1976 | Kennedy | 198/437 |
| 4,144,965 | * 3/1979 | Alldredge et al. | 198/831 |
| 4,387,798 | * 6/1983 | Jamison et al. | 198/587 |
| 4,499,988 | 2/1985 | Gasser . | |
| 4,538,722 | * 9/1985 | Sumner | 198/861.2 |
| 4,668,148 | * 5/1987 | Sample et al. | 414/790.8 |
| 4,723,649 | * 2/1988 | Hartness et al. | 198/442 |
| 5,033,605 | * 7/1991 | Marquart | 198/300 |
| 5,107,978 | * 4/1992 | Andrew | 198/437 |
| 5,129,506 | * 7/1992 | Gutov et al. | 198/712 |
| 5,135,435 | * 8/1992 | Rasmussen | 453/56 |
| 5,188,035 | * 2/1993 | Hideyuki | 104/89 |
| 5,193,363 | * 3/1993 | Petty | 68/205 R |
| 5,215,183 | * 6/1993 | Opperthauser | 198/732 |
| 5,501,156 | * 3/1996 | Richter | 104/89 |
| 5,567,091 | * 10/1996 | Johnson et al. | 406/182 |
| 5,722,532 | * 3/1998 | Troisi et al. | 198/890 |
| 5,730,270 | * 3/1998 | Malow | 193/31 A |
| 5,839,564 | * 11/1998 | Cox | 198/303 |
| 5,944,165 | * 8/1999 | Mannlein et al. | 198/442 |

FOREIGN PATENT DOCUMENTS

| | | |
|---|---|---|
| 1073522 | 1/1960 | (DE) . |
| 1193193 | 9/1963 | (DE) . |
| 2115982 | 4/1971 | (DE) . |
| 2050551 | 4/1972 | (DE) . |
| 2152701 | 10/1972 | (DE) . |
| 3301479A1 | 11/1983 | (DE) . |
| 3402959A1 | 8/1985 | (DE) . |
| 3544708A1 | 6/1987 | (DE) . |
| 667636A5 | 10/1988 | (DE) . |
| 9013845 U | 3/1991 | (DE) . |
| 4112499A1 | 1/1992 | (DE) . |
| 680921A5 | 12/1992 | (DE) . |

(List continued on next page.)

Primary Examiner—Christopher P. Ellis
Assistant Examiner—Joe Dillon, Jr.
(74) Attorney, Agent, or Firm—Jones, Tullar & Cooper, PC

(57) ABSTRACT

A displaceable conveyor is used to convey selected printed products to different destination points. A reversing device is positioned intermediate the different destination points and a rigid guide track. A partial guide path connects the reversing device with the rigid guide track.

10 Claims, 3 Drawing Sheets

FOREIGN PATENT DOCUMENTS

| | | |
|---|---|---|
| 9217368 | 5/1994 | (DE) . |
| 4403273A1 | 9/1994 | (DE) . |
| 0427673A1 | 11/1990 | (EP) . |
| 51-151953 | * 12/1976 | (JP) . |
| 56008801 | 12/1979 | (JP) . |
| 5-42221 | * 6/1993 | (JP) . |

* cited by examiner

CONVEYOR

FIELD OF THE INVENTION

The present invention relates to a spatially conductible conveying installation with an endless conveyor chain guided in a rigid guide. The conveying installation is useable with folded or not folded printed products.

DESCRIPTION OF THE PRIOR ART

A spatially conductible conveying installation for conveying printed newspaper, as well as book and magazine products is known from CH 680 921 A5.

It is disadvantageous in connection with this prior art conveying installation, that the conveyed objects can only be deposited at one destination.

CH 667 636 A5 describes an installation for transferring printed products into a helical stack. An intermediate conveyor with flexible guide rails is provided for this, the location of which can be changed.

JP-A-56-988011 discloses a directionally changeable conveying installation.

SUMMARY OF THE INVENTION

The object of the present invention is based on creating a conveying installation with an endless conveyor chain with clamping devices for conveying printed products. By using the present invention, it is possible to selectively deposit printed products conducted by it at various destinations.

In accordance with the present invention, this object is attained by providing a conveying installation with an endless conveyor chain. The chain is guided in a rigid guide and conveys folded or not folded printed products. The conveyor chain can start near a folder or a cutter and has a reversing device adjacent the cutter or folder. A second reversing device remote from the cutter or folder can be moved horizontally and/or vertically.

The advantages which can be achieved by means of the present invention reside in particular in that the printed products conveyed by means of the spatially conducted installation can be selectively deposited at or ahead of—i.e. viewed in the direction of conveyance of the printed products—a reversing device remote from a folding apparatus, or in its vicinity, at different destinations. These destinations can be, for example, a plurality of conveyor belts extending parallel with each other on a level. In this case it is particularly advantageous that the deposit of the printed products can respectively take place in the direction of conveyance of the conveyor belts.

In accordance with another preferred embodiment, it is also advantageously possible to provide the destinations for depositing the printed products at different levels. This can be done in accordance with the invention in that the "head" of the conveying installation is hingedly connected with a spatially movable support arm. If the destination of the printed products is to be changed, it is not necessary to reduce the running speed of the conveyor chain for this.

BRIEF DESCRIPTION OF THE DRAWINGS

A preferred embodiment of the present invention is represented in the drawings and will be described in greater detail in what follows.

Shown are in.

DESCRIPTION OF THE PREFERRED EMBODIMENT

Figure 1:
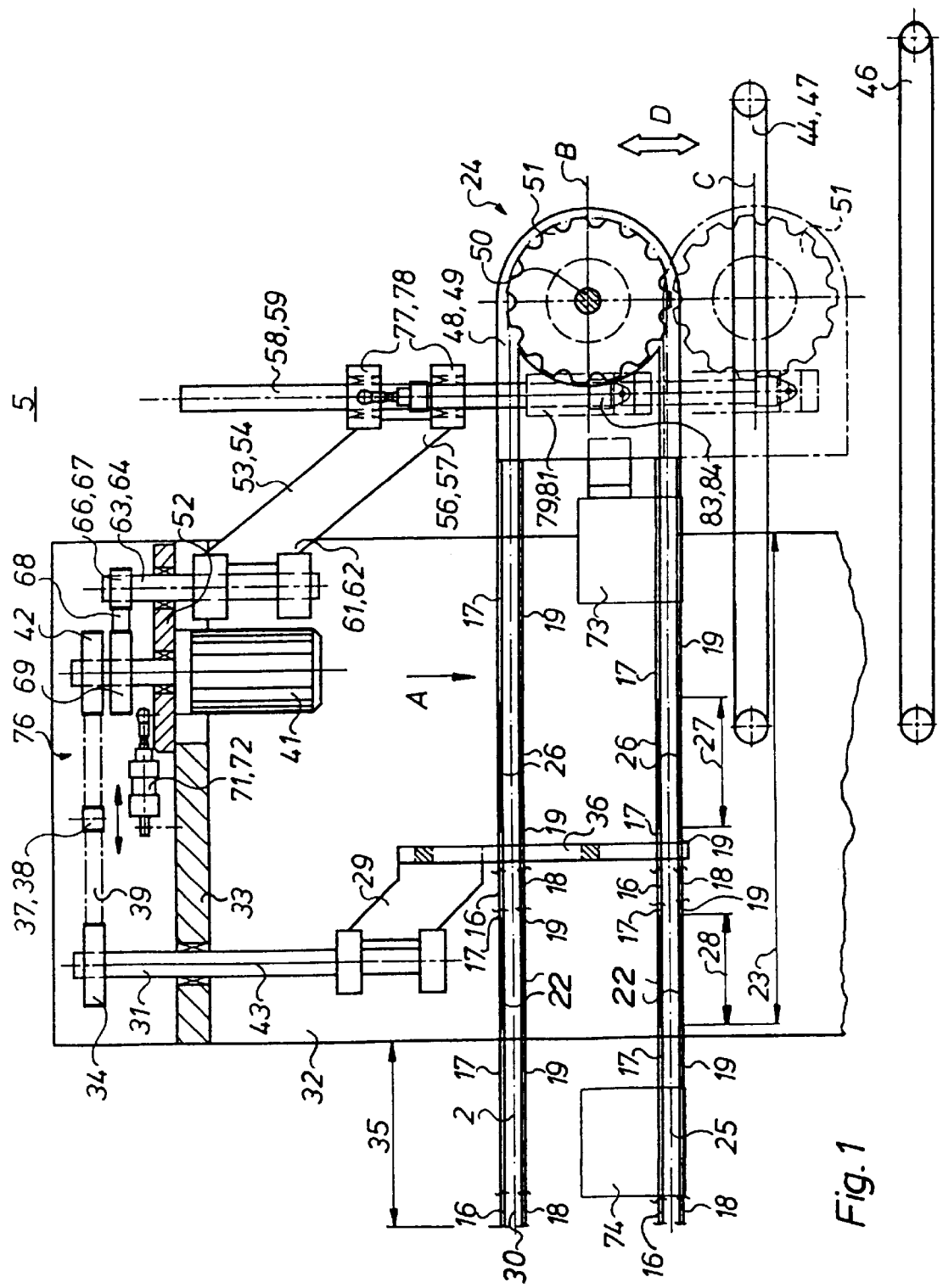
FIG. 1, a schematic representation of a lateral view of the conveying installation.
Figure 2:
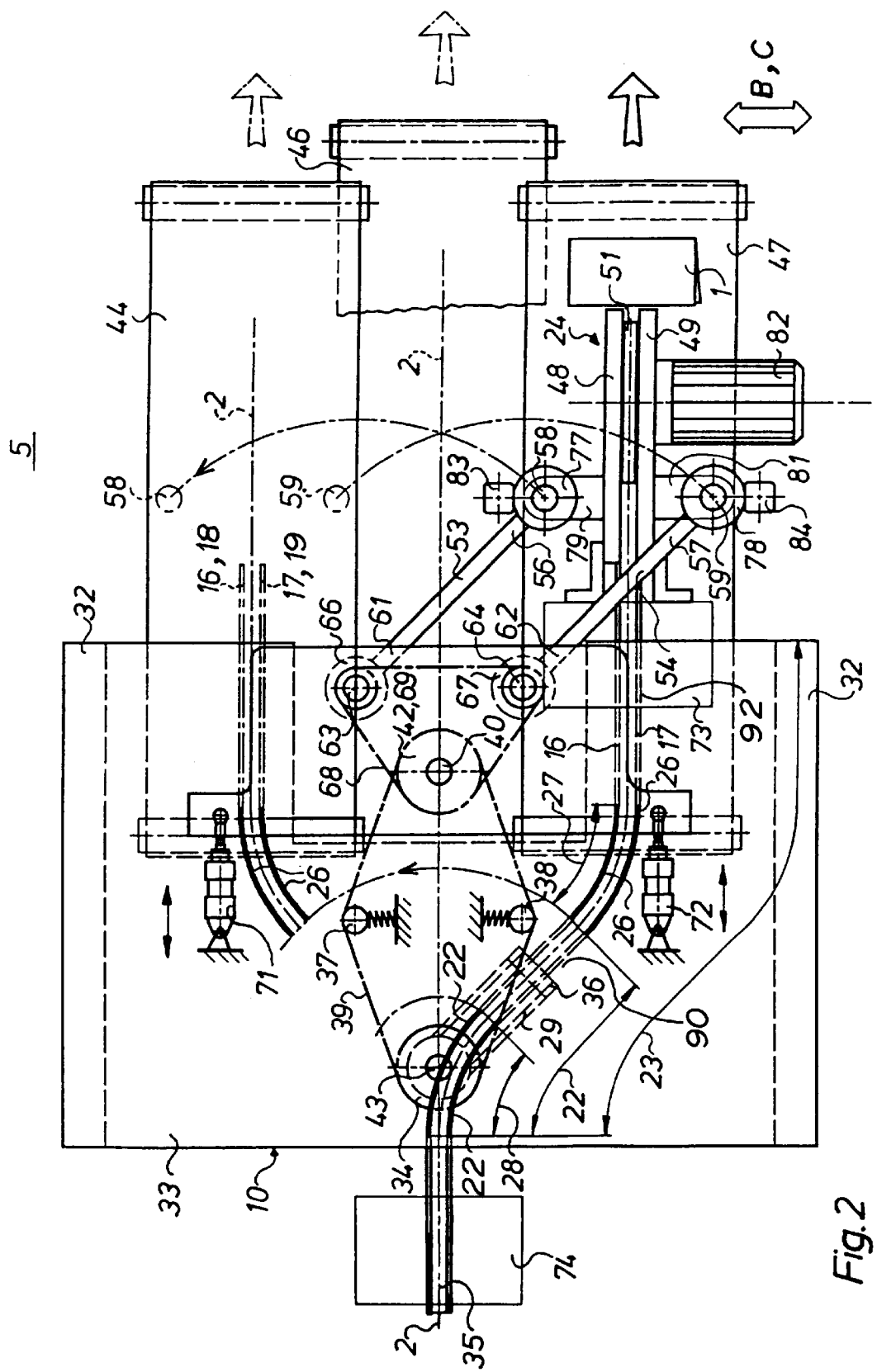
FIG. 2, a view from above on the conveying installation in FIG. 1.

A spatially conducted conveying installation 5 for conveying printed products 1, as seen in FIGS. 1 and 2 consists, for example, of an endless conveyor chain 2 and rigid guide elements extending respectively in the direction of conveyance and back, for example four rod-shaped guide elements 16, 17, 18, 19. The guide elements 16 to 19 are—viewed in cross section—the end points of a square, The four guide elements 16 to 19 are maintained at a predetermined distance from each other by means of a ring-shaped clamp 21, for example, at distances of approximately 1.5 times the length of a chain link 7 as shown most clearly in FIG. 3.

Figure 3:
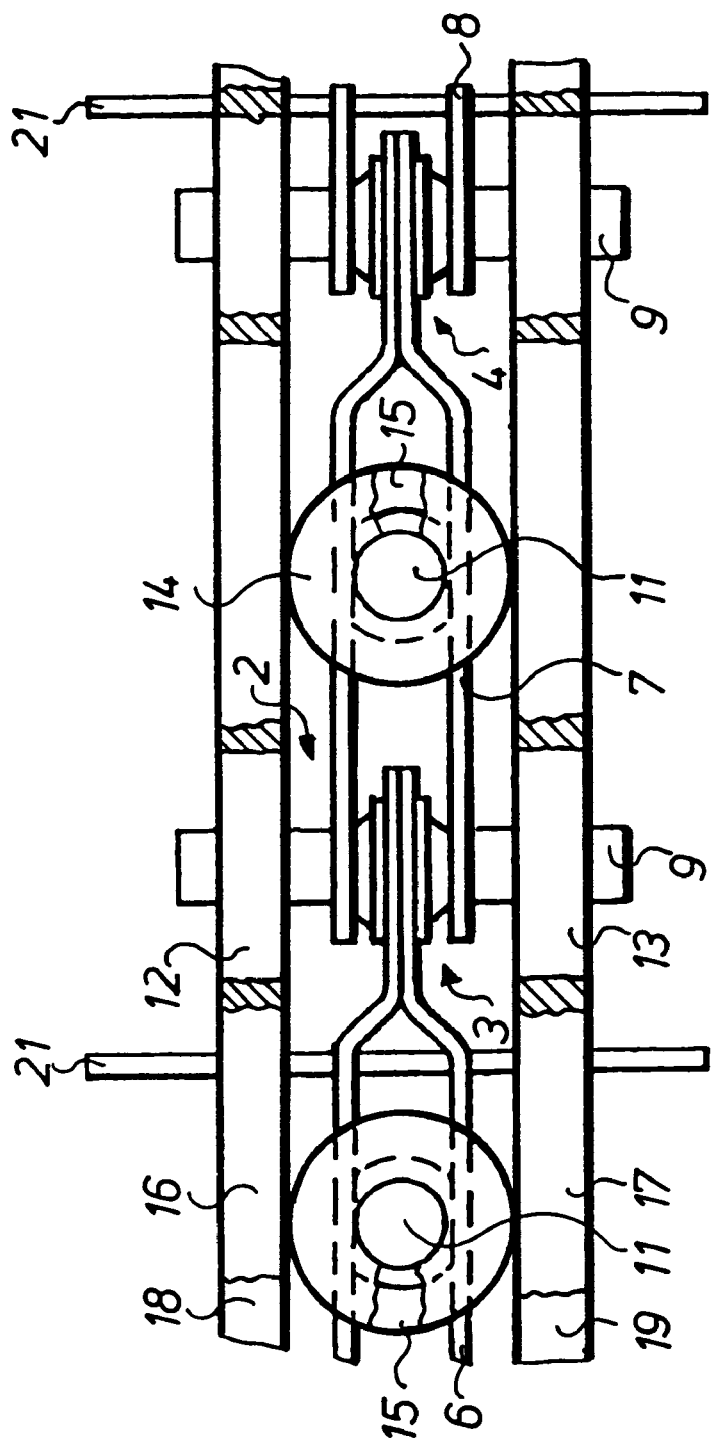
FIG. 3, a view A in accordance with FIG. 1 with an enlarged representation of the conveyor chain conducted in guide elements.

This conveyor chain 2 has a multitude of chain links 6, 7, 8, which are connected by means of connecting links 3, 4. Each chain link 6,7, 8 has two spaced shafts 9, 11, as shown in FIG. 3. Rollers 12, 13, 14, 15 are arranged in pairs on each shaft 9, 11. The two spaced shafts 9, 11 of each chain link 6 to 8 are arranged crosswise, i.e. offset at an angle of 90° from each other, so that on the one hand the rollers 12, 13 of the shaft 9 are supported between the guide elements 16, 18, or respectively 17, 19, and on the other hand the rollers 14, 15 of the shaft 11 are supported between the guide elements 16, 17, or respectively 18, 19.

Clamping devices, not shown in further detail, which are fastened on the chain links 6 to 8, an each receive a printed product 1.

The conveying installation 5 consists of 1. essentially a first reversing device, not specifically represented. This first reversing device may be situated near the folding apparatus, and, for example, may even be integrated into he outlet of the folding apparatus, for guiding and reversing the direction of the endless conveyor chain 2. A second reversing device 24 is located remote from the folding apparatus and can consist of a reversing wheel 51, which is fixed in place on a frame, as seen in FIG. 1 and a device for opening and closing the clamping devices of the conveyor chain 2. The clamping devices of the conveyor chain 2 take up the printed products 1 from the folding apparatus and convey them at most as far as the reversing device 24 for the conveyor chain 2 which is positioned remote from the folding apparatus;

2. a guide path for the conveyor chain 2 between the two separated reversing devices located respectively close to and remote from the folding apparatus. The largest part of the guide path is rigid and fastened on the building. Only a first partial guide path 23, which is located ahead of, or before, the second reversing device 24 remote from the folding apparatus is itself movable and is therefore horizontally and/or vertically movable, together with the second reversing device 24, for depositing printed products 1. Moreover, a device for opening and closing the clamping devices of the conveyor chain 2 is provided for depositing the printed products 1 selectively on one of several conveyor belts 44, 46, 47, as depicted in FIG. 2

The movable first partial guide path 23 starts at the rigid end 10 of the rigid portion of the second partial guide path 35 of the conveying installation 5; and 3. of the above mentioned conveyor chain 2. Conveyor chain 2 is preferably movable in all directions (upward, downward, to the left, to the right). This also applies to movable intermediate guide elements 22, 26.

The pivotable, movable partial guide track 23, as well as the movable reversing device 24, have rod-shaped guide elements 16 to 19, at least on the level of the lower chain guide track 25 and the upper chain guide track 30 of the conveying installation 5.

As can be seen in FIG. 2, the pivotable, movable partial guide track 23 includes a concave, movable, curved first flexible intermediate guide element 22 and a movable, convex, curved second flexible intermediate guide element 26. A first rigid guide element 90 is connected to the first, 22, and to the second intermediate guide element 26, and extends between the two. A second rigid guide element is 92 connected to the second intermediate guide element 26, and extends to the reversing wheel 51 and is fastened on the reversing device 24. The above-described structure of the partial guide path 23 applies to both the lower chain guide track 25 with the clamped printed products 1, and to the upper chain guide track 30, from which the printed products 1 have been removed, of the conveyor chain 2. In the course of the movement of the second reversing device 24 from a position overlying a first delivery belt 47 to a position overlying a last delivery belt 44 as shown in FIG. 2, the concave curvature of the first flexible intermediate guide element 22 becomes a convex curvature. The convex curvature of the second flexible intermediate guide element 26 becomes a concave curvature.

The flexible guiding intermediate guide elements 22, 26 are also kept apart at a predetermined distance by means of the ring-shaped clamps 21.

It is easily possible to arrange stationary guides, not specifically represented, above the delivery belts 47, 44, in place of the movable intermediate guide elements 26 arranged in the curved area 27. These guides can respectively be designed to be plate-shaped and can be lowered prior to pivoting the reversing devices 24 in the vertical direction. In this way only parts of the device are movable. As shown in FIGS. 1 and 2, the first intermediate guide element 22 can be supported by a crank-shaped shaft 29, whose first end 31 is rotatably seated in a bridge 32, 33 fixed on the lateral frame and is provided with a toothed belt wheel 34. The second end 36 of the crank-shaped shaft 29 is embodied in the shape of a fork and has rod-shaped, or respectively rigid guide elements 16 to 19 in the straight section 90 of the upper and lower chain guide tracks 25, 30 of the conveying installation 5. Again, flexible intermediate guide elements 22 are employed in the curved area 28 of the partial guide path 23. As already described, the flexible intermediate guide elements 22 are connected with the straight portion of each of the rod-shaped guide elements 16 to 19.

Since the upper and lower flexible intermediate guide elements 22, 26 are embodied to be pivotable at least in a horizontal level B—for example over an angle of 90°-, the toothed belt wheel 34 is connected with a toothed belt wheel 42 fastened on the shaft 40 of a motor 41 by means of a toothed belt 39 guided over tensing rollers 37, 38. The housing of the motor 41 is arranged, fixed against relative rotation, on a carriage 52, which is arranged on the bridge 33 fixed on the lateral frame, and which is movable back and forth in the conveying direction of the conveyor belts 44, 46, 47, as well as in the opposite direction.

The first partial guide path 23 can be pivoted out of a right end position shown in solid lines in FIG. 2 into a left end position which is indicated by dashed lines in FIG. 2 by actuating the motor 41 in a counterclockwise direction. In the course of this, a multitude of possible intermediate deposit locations (not represented), arranged in a crescent-shape in respect to the pivot axis 43 of the guide 23, for the printed products 1 result between the two right and left positions.

The reversing device 24 consists of two holding plates 48, 49 and a reversing wheel 51, which is rotatably seated on a shaft 50 between the holding plates 48, 49. Movement of the reversing device 24 is provided by means of two pivotable support arms 53, 54, which are seated parallel in respect to each other. At their outer ends 56, 57 close to the holding plates 48 and 49, the support arms 53, 54 have linear guides 77, 78. The linear guides 77, 78 move slidingly on vertically arranged spindles 58, 59. On their lower ends, the spindles 58, 59 are fixedly maintained in supports 79, 81. The supports 79, 81 are fastened on the holding plates 48, 49. The housing of a work cylinder 83, 84 is fastened on each support 79, 81, whose piston rod end is respectively seated on the linear guide 77, 78. An inboard end 61, 62 of each of the support arms 53, 54 close to the lateral frames is respectively connected, fixed against relative rotation, with a first end of a shaft 63, 64, seated in the carriage 52. A toothed belt wheel 66, 67 is respectively fastened on a second end of each shaft 63, 64. Each toothed belt wheel 67, 68 is driven by means of a second toothed belt 68 by a toothed belt wheel 69 also fixed in place on the shaft 40 of the motor 41.

The carriage 52 is arranged on the bridge 33 by means of linear guides, not represented, so that it can be moved back and forth in response to the force supplied by pneumatically actuable piston-cylinder units 71, 72.

The functioning of the conveying installation with the movable reversing device 24 in accordance with the present invention is described in what follows. The printed products 1 suspended from the chain links 6 to 8 of the conveyor chain 2 are released from the chain links 6 to 8, for example by means of a known opening mechanism 73, which is not represented in detail, and are deposited on the conveyor belt 47 in the orientation of the conveying installation shown in FIG. 2. If it is now intended to deliver the printed products 1 to another conveyor belt, for example to the conveyor belt 44, the printed products are shunted off at a known waste shunt 74 until the shifting process of the second conveying device 24 is terminated.

The toothed belt wheels 34, as well as 66, 67, which are driven by the motor 41 of the toothed belt gear 76, provide the synchronous pivoting of the crank-shaped shaft 29 of the pivotable guide 23, as well as of the two support arms 53, 54 of the reversing device 24. In the course of this syncronous pivoting the carriage 52 is moved back and forth in two directions on the bridge 33. In the process, the conveyor chain 2, circulating at the operating speed, always remains tensed.

After the reversing device 24 with the conveyor chain 2 has taken up its position above the conveyor belt 44, the waste shunt 74 is deactivated, so that the printed products 1 are now deposited on the conveyor belt 44. The reversing device 24 can be locked in its production position.

In accordance with a second preferred embodiment, the reversing device 24 can also be designed to be movable in a vertical direction D. This is achieved, for example, in that the reversing device 24 can be brought out of the first horizontal level B into the second horizontal level C by means of the working cylinders 83, 84, as seen in FIG. 1. In this way, the reversing device 24 is placed above the conveyor belt 46, shown in dashed lines in FIG. 2, and which is centered between the two conveyor belts 44, 47.

In accordance with a third preferred embodiment it is also possible to design the curved area 28 to be movable in the horizontal direction B, and also in the vertical direction D. This can be done, for example, in that both horizontally and vertically flexible guide elements 16–19 can be untilized. The end of the reversing device 24 can also be arranged manually, for example, above the desired destination and fastened on arbitrary, known holding elements.

The reversing wheel 51 can be connected via its shaft 50 with a drive, for example a motor 82.

The installation in accordance with the present invention can be used in connection with folding apparatus, as well as with so-called "cutters", i.e. together with a devices delivering folded or not folded signatures or sheets.

While preferred embodiments of a conveyor in accordance with the present invention have been set forth fully and completely hereinabove, it will be apparent to one of skill in the art that a number of changes in, for example the type of press being used, the clamping assembly for the printed products, and the like may be made without departing from the true spirit and scope of the present invention which is accordingly to be located only by the following claims.

What is claimed is:

1. A conveying installation for printed products comprising:
   an endless conveyor chain;
   a rigid guide track, said rigid guide track guiding said endless conveyor chain and extending to a reversing device;
   means for moving said reversing device horizontally between a first reversing device position and a second reversing device position and
   a partial, flexible guide path intermediate said reversing device and said rigid guide track, said partial, flexible guide path being selectively positionable in respective first and second partial, flexible guide path positions when said reversing device is in respective ones of said first and second reversing device positions.

2. The conveying installation of claim 1 further including additional positions of said reversing device and wherein said partial, flexible guide path is movable between all of said additional positions of said reversing device.

3. The conveying installation of claim 1 further including first and second parallel conveyor belts associated with said first and second positions of said reversing device.

4. The conveying installation of claim 1 including a reversing wheel in said reversing device and further including movable support arms supporting said reversing wheel.

5. The conveying installation of claim 1 wherein said reversing device is horizontally movable.

6. The conveying installation of claim 1 wherein said partial flexible guide path is movable horizontally between said rigid guide track and said reversing device.

7. The conveying installation of claim 6 wherein said partial guide path includes movable intermediate guide elements.

8. A conveying installation for conveying printed products from a folder, said conveying installation comprising:
   an endless conveyor chain;
   a rigid guide track guiding said endless conveyor chain and extending between the folder and a reversing device remote from the folding apparatus;
   means for moving said reversing device horizontally between a first position and a second position;
   means for moving said reversing device vertically; and
   a flexible partial guide track intermediate said reversing device and said rigid guide track.

9. The conveying installation of claim 8 wherein said partial guide path includes movable intermediate guide elements.

10. The conveying installation of claim 8 including a reversing wheel in said reversing device and further including movable support arms supporting said reversing wheel.

* * * * *